(12) United States Patent
Nigo et al.

(10) Patent No.: US 10,804,754 B2
(45) Date of Patent: Oct. 13, 2020

(54) PERMANENT MAGNET EMBEDDED MOTOR, COMPRESSOR, AND REFRIGERATING AND AIR CONDITIONING APPARATUS

(71) Applicant: Mitsubishi Electric Corporation, Tokyo (JP)

(72) Inventors: Masahiro Nigo, Tokyo (JP); Kazuchika Tsuchida, Tokyo (JP); Sadami Okugawa, Tokyo (JP); Yoshinori Iwanabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 15/746,061

(22) PCT Filed: Aug. 21, 2015

(86) PCT No.: PCT/JP2015/073542
§ 371 (c)(1),
(2) Date: Jan. 19, 2018

(87) PCT Pub. No.: WO2017/033229
PCT Pub. Date: Mar. 2, 2017

(65) Prior Publication Data
US 2018/0212482 A1    Jul. 26, 2018

(51) Int. Cl.
*H02K 1/18* (2006.01)
*H02K 21/16* (2006.01)
(Continued)

(52) U.S. Cl.
CPC ............. *H02K 1/185* (2013.01); *F04B 35/04* (2013.01); *F25B 31/023* (2013.01); *H02K 1/148* (2013.01);
(Continued)

(58) Field of Classification Search
CPC ........ H02K 1/185; H02K 1/148; H02K 21/16; H02K 7/14; H02K 1/276; H02K 1/16; H02K 1/18; F25B 31/023; F04B 35/04
(Continued)

(56) References Cited

U.S. PATENT DOCUMENTS 8,164,230 B2    4/2012   Sugiyama
9,030,076 B2    5/2015   Sato
(Continued)

FOREIGN PATENT DOCUMENTS

JP    2005-051941 A    2/2005
JP    2007-104830 A    4/2007
(Continued)

OTHER PUBLICATIONS

Machine Translation, Nigo, JP-2013059262-A, Mar. 2013. (Year: 2013).*
(Continued)

*Primary Examiner* — Thomas Truong
(74) *Attorney, Agent, or Firm* — Posz Law Group, PLC

(57) ABSTRACT

A permanent magnet embedded motor includes a cylindrical stator core disposed on an inner side of a cylindrical frame and configured by stacking a first annular core and a second annular core disposed to be adjacent to the first annular core in an axial direction of the frame, and a rotor disposed on an inner side of the stator core. The second annular core is fixed to the first annular core by using swaging portions formed in the second annular core, and adjacent first yokes are in contact with each other, while adjacent second yokes are separated from each other.

5 Claims, 13 Drawing Sheets

(51) Int. Cl.
*H02K 1/14* (2006.01)
*F04B 35/04* (2006.01)
*F25B 31/02* (2006.01)
*H02K 1/16* (2006.01)
*H02K 1/27* (2006.01)
*H02K 7/14* (2006.01)

(52) U.S. Cl.
CPC .............. *H02K 1/16* (2013.01); *H02K 1/18* (2013.01); *H02K 1/276* (2013.01); *H02K 7/14* (2013.01); *H02K 21/16* (2013.01)

(58) Field of Classification Search
USPC ...................................... 310/156.56
See application file for complete search history.

(56) References Cited

U.S. PATENT DOCUMENTS

| | | | |
|---|---|---|---|
| 2009/0039727 A1* | 2/2009 | Kato | H02K 1/148 310/216.008 |
| 2010/0007236 A1* | 1/2010 | Sano | H02K 1/148 310/216.135 |
| 2010/0060099 A1 | 3/2010 | Sugiyama | |
| 2013/0062989 A1* | 3/2013 | Neuenschwander | B23P 11/005 310/216.004 |
| 2014/0368080 A1* | 12/2014 | Miyajima | H02K 1/148 310/216.065 |

FOREIGN PATENT DOCUMENTS

| | | | |
|---|---|---|---|
| JP | 2007104830 A | * | 4/2007 |
| JP | 2010-068569 A | | 3/2010 |
| JP | 2010-074881 A | | 4/2010 |
| JP | 2010074881 A | * | 4/2010 |
| JP | 2011-254625 A | | 12/2011 |
| JP | 2013-059262 A | | 3/2013 |
| JP | 2013059262 A | * | 3/2013 |

OTHER PUBLICATIONS

Machine Translation, Shono, JP-2007104830-A, Apr. 2007. (Year: 2007).*
Machine Translation, Terai, JP-2010074881-A, Apr. 2010. (Year: 2010).*
Office action dated Aug. 28, 2018 issued in corresponding JP patent application No. 2017-536072 (and English machine translation thereof).
International Search Report of the International Searching Authority dated Nov. 10, 2015 for the corresponding International application No. PCT/JP2015/073542 (and English translation).
Office Action dated Feb. 18, 2019 issued in corresponding KR patent application No. 10-2018-7001409 (and English machine translation).
Office Action dated Apr. 28, 2019 issued in corresponding CN patent application No. 201580081869.6 (and English machine translation).
Office action dated Jun. 18, 2019 issued in corresponding KR patent application No. 10-2018-7001409 (and English translation thereof).

* cited by examiner

100

FIG.7
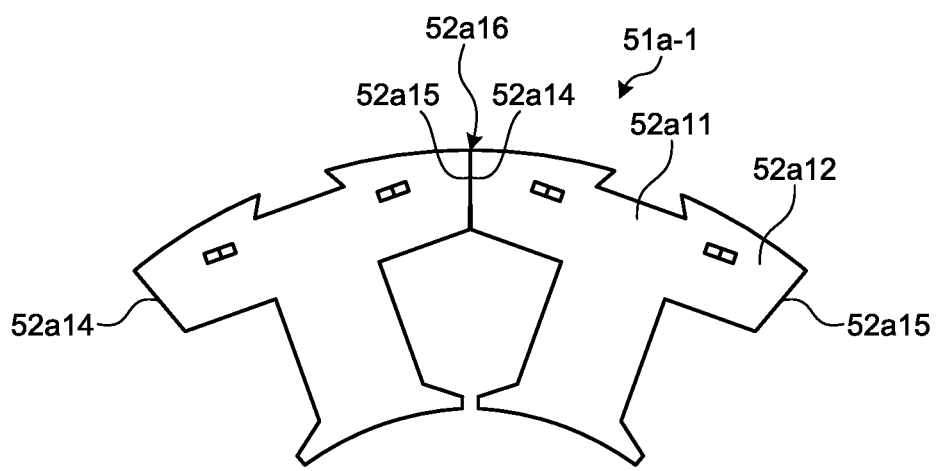
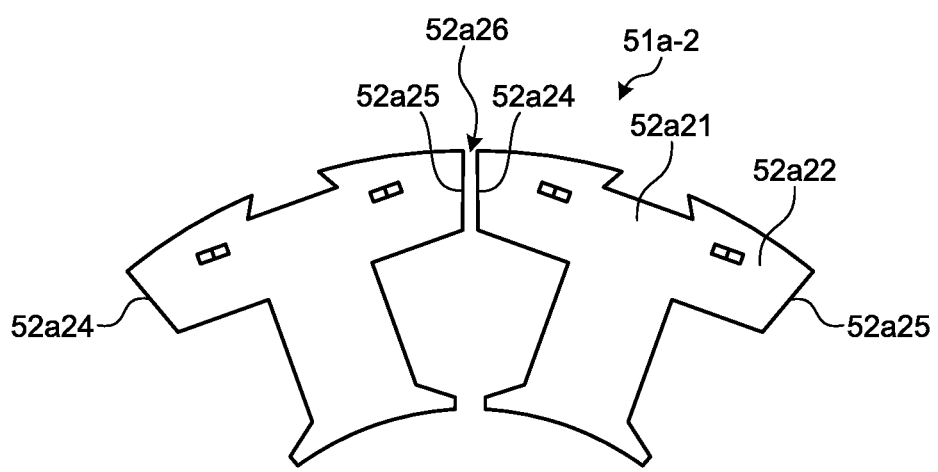

US 10,804,754 B2

PERMANENT MAGNET EMBEDDED MOTOR, COMPRESSOR, AND REFRIGERATING AND AIR CONDITIONING APPARATUS

CROSS REFERENCE TO RELATED APPLICATION

This application is a U.S. national stage application of International Patent Application No. PCT/JP2015/073542 filed on Aug. 21, 2015, the disclosure of which is incorporated herein by reference.

TECHNICAL FIELD

The present invention relates to a permanent magnet embedded motor including a stator core disposed on the inner side of a cylindrical frame and a rotor disposed on the inner side of the stator core, and also relates to a compressor and a refrigerating and air conditioning apparatus.

BACKGROUND

Some conventional permanent magnet embedded motors employ a structure in which a cylindrical frame is fitted and fixed onto a stator core configured by combining a plurality of core pieces into an annular shape in order to facilitate formation of a coil. The frame is fitted and fixed onto the stator core in the manner as described above, and thus the adjacent core pieces come into contact with each other. This increases the rigidity of the stator core and improves the inner-diameter roundness of the stator core. Thus, a stator core configured by combining a plurality of core pieces into an annular shape often needs to be fitted and fixed onto the frame. Therefore, there is a problem in that the magnetic properties of the stator core degrade after the frame is fitted and fixed onto the stator core.

A conventional permanent magnet synchronous motor described in Patent Literature 1 includes an annular yoke portion formed annularly by disposing a plurality of divided yoke portions, each of which includes a yoke and a tooth projecting from the yoke, in the circumferential direction of a core case such that the divided yoke portions are adjacent to each other. The adjacent divided yoke portions are in contact with each other at their projecting portions. These projecting portions are formed by partially cutting a section between the adjacent divided yoke portions. As the projecting portions are formed, a gap portion is formed between the adjacent divided yoke portions. In the conventional permanent magnet synchronous motor described in Patent Literature 1, the projecting portions are provided between the adjacent divided yoke portions. This suppresses an increase in compressive stress generated in the main magnetic-flux region between the adjacent divided yoke portions when the frame is fitted and fixed onto the stator core, and thus improves the motor efficiency.

PATENT LITERATURE

Japanese Patent Application Laid-open No. 2005-51941

However, in the conventional technique, because the contact area between the projecting portions of the adjacent divided yoke portions is small, the rigidity of the stator core in which the divided yoke portions are assembled into an annular shape is not sufficient. Thus, the noise and vibration level tends to increase. Further, it is difficult to assemble the divided yoke portions in such a manner that their contact portions are not misaligned. Accordingly, the inner-diameter roundness of the stator core tends to degrade. If there are variations in the positions of the tooth ends, this increases cogging and adversely affects the motor characteristics. Furthermore, because there is a gap in a magnetic path in the yoke portion, an increase in magnetic reluctance is unavoidable. Since an increase in magnetic reluctance cancels out an iron-loss reduction effect, a sufficient effect is not necessarily obtained from the conventional technique.

SUMMARY

The present invention has been achieved to solve the above problems, and an object of the present invention is to provide a permanent magnet embedded motor that can have improved efficiency while reducing the vibration level.

In order to solve the above problems and achieve the object, a permanent magnet embedded motor according to an aspect of the present invention includes: a cylindrical frame; a cylindrical stator core, which is disposed on an inner side of the cylindrical frame and configured by stacking a first annular core and a second annular core in an axial direction of the cylindrical frame; and a rotor disposed on an inner side of the cylindrical stator core. The first annular core is formed annularly by disposing a plurality of first core pieces, respectively including first yokes, first teeth projecting from the first yokes, and first swaging portions, such that each of the first core pieces is in contact with the adjacent one of the other first core pieces, the second annular core is disposed adjacent to the first annular core and formed annularly by disposing a plurality of second core pieces, respectively including second yokes, second teeth projecting from the second yokes, and second swaging portions, such that each of the second core pieces is separated from adjacent one of the other second core pieces, and the first annular core and the second annular core are fixed to each other by using the first swaging portions and the second swaging portions.

The permanent magnet embedded motor according to the present invention has an effect where it is possible to have improved efficiency while reducing the vibration level.

BRIEF DESCRIPTION OF DRAWINGS

FIG. 7 is a partially enlarged view of the first annular core and the second annular core that constitute the stator core before a frame is fitted and fixed onto the stator core.

DETAILED DESCRIPTION

A permanent magnet embedded motor, a compressor, and a refrigerating and air conditioning apparatus according to embodiments of the present invention will be described in detail below with reference to the accompanying drawings. The present invention is not limited to the embodiments.

First Embodiment

Figure 1:
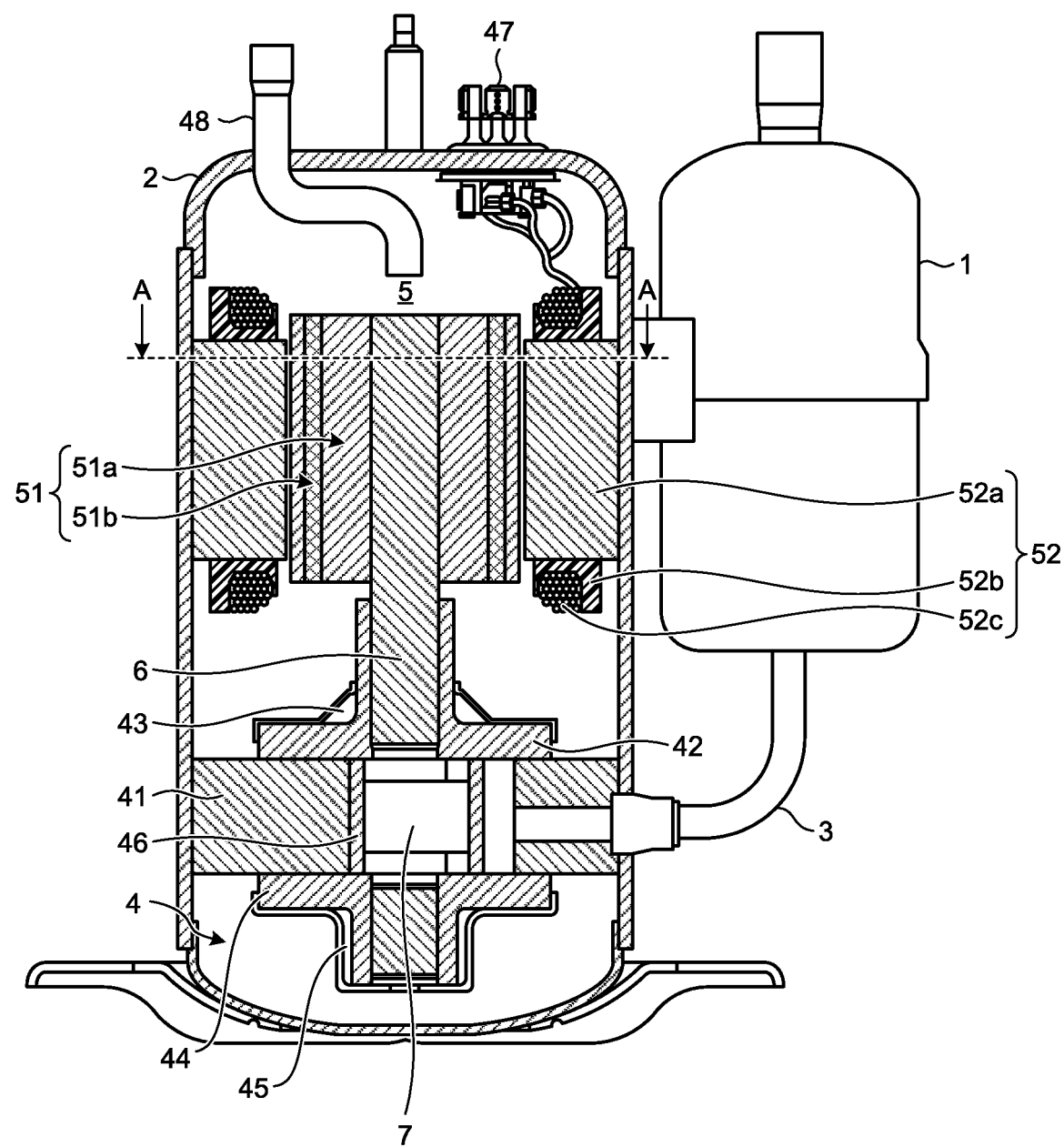
FIG. 1 is a cross-sectional view of a compressor in which a permanent magnet embedded motor according to a first embodiment is incorporated.

FIG. 1 is a cross-sectional view of a compressor in which a permanent magnet embedded motor according to a first embodiment is incorporated. A compressor 100 includes an accumulator 1, which separates refrigerant gas supplied from an evaporator (not illustrated) from the remaining liquid refrigerant; a compression mechanism 4, which is installed in a cylindrical frame 2 and compresses refrigerant gas supplied from the accumulator 1 through a suction pipe 3; and a permanent magnet embedded motor 5, which is installed in the frame 2 and drives the compression mechanism 4. In the following descriptions, the permanent magnet embedded motor is sometimes simply referred to as "motor".

The compression mechanism 4 includes a cylinder 41 fixed to the inner portion of the frame 2 and supplied with refrigerant gas from the accumulator 1; an upper frame 42, into which one end side of a rotation shaft 6 is inserted and which closes one axial end of the cylinder 41; an upper discharge muffler 43 attached to the upper frame 42; a lower frame 44, which closes the other axial end of the cylinder 41; a lower discharge muffler 45 attached to the lower frame 44; and a piston 46, which is disposed in the cylinder 41 and performs, together with an eccentric portion 7 provided on the rotation shaft 6, an eccentric rotational motion within the cylinder 41.

The other end side of the rotation shaft 6 is inserted into a rotor core 51a, which constitutes the motor 5. The one end side of the rotation shaft 6 extends through the interior space of the cylinder 41 and is held in a rotatable state by the upper frame 42 and the lower frame 44. On the one end side of the rotation shaft 6, the eccentric portion 7 is formed which compresses a refrigerant together with the piston 46.

The motor 5 includes a stator 52 and a rotor 51.

The stator 52 is a cylindrical stacked body obtained by stacking a plurality of iron core pieces stamped from an electromagnetic steel plate with a thickness of 0.2 mm to 0.5 mm on one another. The stator 52 is formed by stacking first annular cores and second annular cores on one another. The first annular cores and the second annular cores will be described later. The stator 52 is configured to include a cylindrical stator core 52a fitted and fixed to the inner circumferential surface of the frame 2; an insulator 52b, which covers the stator core 52a; and coils 52c. The coils 52c are wound on the stator core 52a with the insulator 52b therebetween by either a concentrated winding method or a distributed winding method, and generate a magnetic field by using electric power supplied from a glass terminal 47 fixed to the frame 2. Examples of fitting and fixing the frame onto the stator core include shrink-fit, cold-fit, and press-fit.

For example, in the shrink-fit, the stator core 52a is manufactured at a room temperature so as to have an outer diameter that is slightly greater than the inner diameter of the frame 2. The frame 2 is then heated to approximately 300° C. to be expanded. The expanded frame 2 is fitted onto the stator core 52a. Thereafter, as the temperature of the frame 2 decreases, the frame 2 shrinks. The stator core 52a is thus fixed to the inner circumferential surface of the frame 2. The insulator 52b is made of paper or insulating resin such as PolyButylene Terephthalate (PBT), Poly Phenylene Sulfide (PPS), Liquid Crystal Polymer (LCP), or PolyEthylene Terephthalate (PET).

The rotor 51 is formed by stacking, on one another, a plurality of iron core pieces that are stamped from an electromagnetic steel plate. The rotor 51 includes the rotor core 51a disposed on the inner side of the stator core 52a and a plurality of permanent magnets 51b embedded in the rotor core 51a. At the center of the rotor core 51a, the rotation shaft 6 that transmits rotational energy is fitted in and fixed to the rotor core 51a.

In the motor 5 configured as described above, current with a frequency synchronized with the command rotational speed flows in the coil 52c. A rotating magnetic field is thereby generated and thus the rotor 51 rotates. In the compressor 100 in which the rotor 51 is rotating, refrigerant gas supplied from the accumulator 1 is admitted into the cylinder 41 through the suction pipe 3 fixed to the frame 2. As the rotor 51 rotates, the eccentric portion 7 rotates within the cylinder 41 and the piston 46 compresses the refrigerant. The compressed high-temperature refrigerant passes through the upper discharge muffler 43 and the lower discharge muffler 45. Thereafter, the refrigerant flows upward within the frame 2 through the gap between the rotor 51 and the stator 52. The refrigerant then passes through a discharge pipe 48 provided on the frame 2 and is supplied to the high-pressure side of the refrigeration cycle within a refrigeration cycle device (not illustrated).

Figure 2:
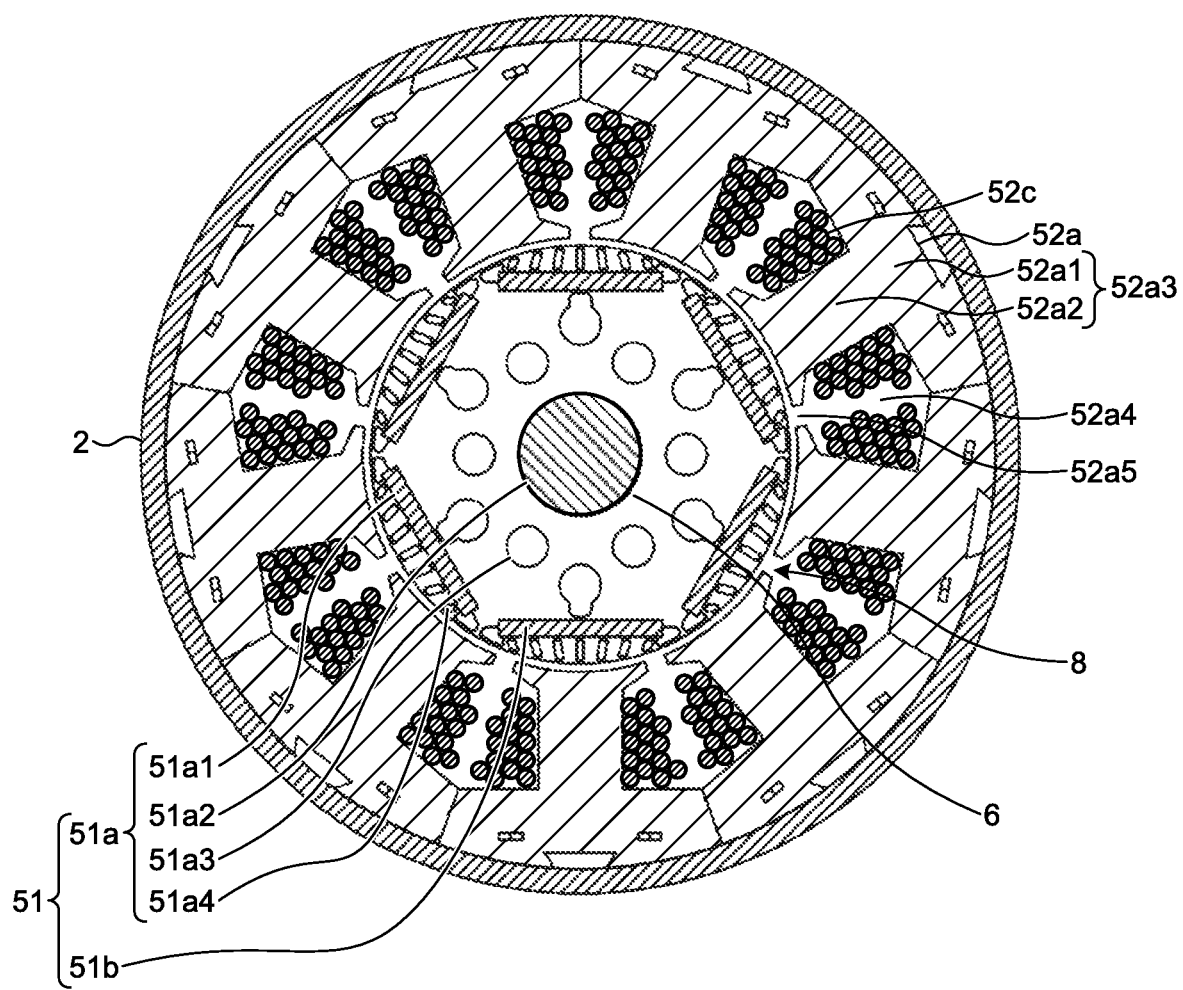
FIG. 2 is a cross-sectional view taken along line A-A in FIG. 1.

FIG. 2 is a cross-sectional view taken along the line A-A in FIG. 1. As illustrated in FIG. 2, the rotor core 51a includes a plurality of rectangular magnet insertion holes 51a1, which are formed to be separated from each other in the circumferential direction; a shaft hole 51a2 into which the rotation shaft 6 is inserted; a plurality of air holes 51a3, which are formed between the shaft hole 51a2 and the magnet insertion holes 51a1 and which serve as a refrigerant flow path; and a plurality of slits 51a4, which are formed on the outer side of the magnet insertion holes 51a1 in the radial direction. Permanent magnets 51b are inserted respectively into the magnet insertion holes 51a1. The permanent magnet 51b is a flat-shaped rare-earth permanent magnet or ferrite magnet. Between the outer circumferential surface of the rotor core 51*a* and the inner circumferential surface of the stator core 52*a*, a gap 8 with a size of 0.3 mm to 1.0 mm is formed.

The stator core 52*a* is formed annularly by disposing a plurality of divided cores 52*a*3, each including a back yoke 52*a*1 and a tooth 52*a*2 projecting from the back yoke 52*a*1, in the circumferential direction of the frame 2 such that the back yokes 52*a*1 are adjacent to each other. In the stator core 52*a*, a plurality of slots 52*a*4 are formed. The slots 52*a*4 are defined by the back yokes 52*a*1 and the teeth 52*a*2. In the stator core 52*a* in FIG. 2, nine slots 52*a*4 are formed. The coil 52*c* is wound around each of the teeth 52*a*2. The end portion of each of the teeth 52*a*2 is formed into an umbrella shape such that both ends extend in the circumferential direction.

A slot opening 52*a*5 is formed between the end portions of the adjacent teeth. The width of the slot opening 52*a*5 is set to a width that facilitates linkage of a magnetic flux generated in the rotor with the stator or is set to an optimum width that reduces a cogging torque. The width of the slot opening 52*a*5 is, for example, 1 mm to 5 mm.

Figure 3:
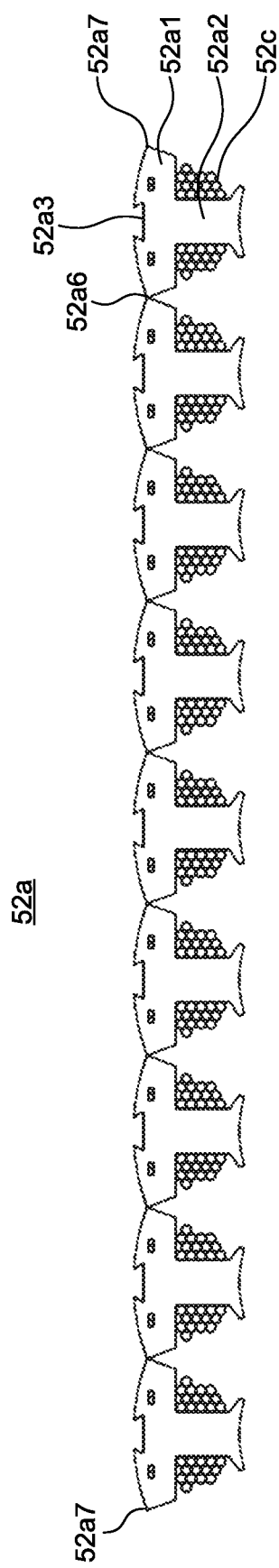
FIG. 3 is a diagram illustrating a plurality of divided cores developed linearly, where the divided cores constitute a stator core according to the first embodiment.

FIG. 3 is a diagram illustrating a plurality of divided cores developed linearly, where the divided cores constitute the stator core according to the first embodiment. A connecting portion 52*a*6 is formed between the adjacent back yokes 52*a*1. The connecting portion 52*a*6 is formed between adjacent core pieces of a plurality of core pieces that constitute a first annular core described later. In order to obtain the stator core 52*a* illustrated in FIG. 2, first, the coil 52*c* is wound around each of the teeth 52*a*2 in a group of the divided cores 52*a*3 that are developed linearly as illustrated in FIG. 3.

Thereafter, the group of the linearly developed divided cores 52*a*3 is bent at the connecting portions 52*a*6 as a joint in such a manner that the end portions of the teeth 52*a*2 face each other. Iron-core mating faces 52*a*7 provided at both ends of the group of the divided cores 52*a*3 are caused to abut against each other. Thereafter, the iron-core mating faces 52*a*7 are welded and fixed to each other.

A general stator core is formed into a cylindrical shape by stacking a plurality of annular iron core pieces stamped from an electromagnetic steel plate on one another. Therefore, in the general stator core, at the time of winding a magnet wire around each of the teeth, the magnet wire needs to be inserted from a slot opening. However, the slot opening is so narrow that the manufacturing process of the coils 52*c* is subject to some constraints, and also there are limitations on the amount of coil that can be provided in a slot. Meanwhile, during motor driving, a rotating magnetic field is generated by current that flows through the coils. This causes copper loss in the coil sections. In order to reduce the copper loss and thus improve the motor efficiency, it is necessary to reduce the resistance of the coils. It is therefore effective to increase the cross-sectional area of the coil and wind the coil at a higher density within a slot.

In the stator core 52*a* according to the first embodiment, the coil 52*c* can be wound around each of the teeth 52*a*2 in the group of the divided cores 52*a*3 that are developed linearly as illustrated in FIG. 3. Therefore, when the coil 52*c* is wound around each of the teeth 52*a*2, it is unnecessary to insert a magnet wire from the slot opening 52*a*5 illustrated in FIG. 2. Accordingly, the alignment of the coil 52*c* is improved. This makes it possible to provide the coil 52*c* having a larger cross-sectional area in a slot at a higher density.

The configuration of the first annular cores and the second annular cores that constitute the stator core 52*a* is described below in detail.

Figure 4:
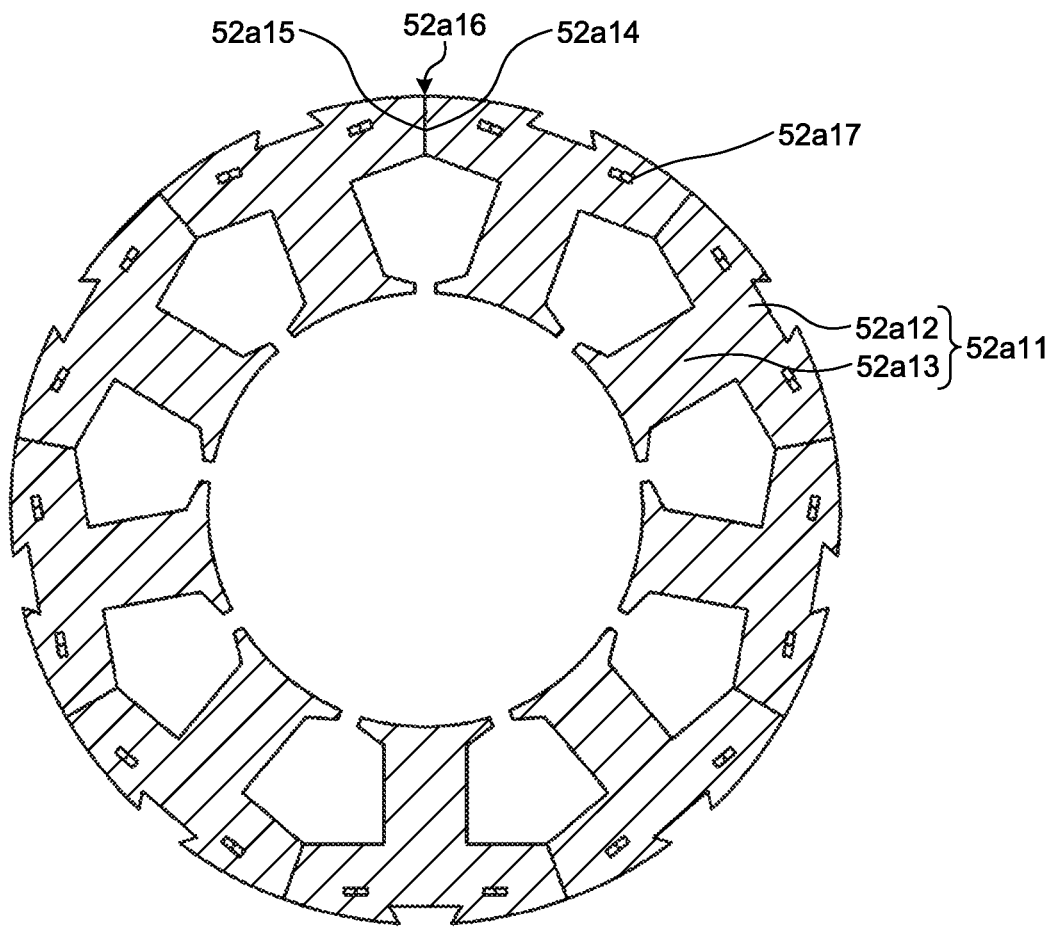
FIG. 4 is a cross-sectional view of a first annular core that constitutes the stator core before being fixed to a frame.

FIG. 4 is a cross-sectional view of the first annular core that constitutes the stator core before being fixed to the frame. A first annular core 51*a*-1 is formed annularly and obtained by disposing a plurality of first core pieces 52*a*11, each including a first yoke 52*a*12, a first tooth 52*a*13 projecting from the first yoke 52*a*12, and first swaging portions 52*a*17, in the circumferential direction of the frame (not illustrated) such that a first end surface 52*a*14 of each of the first yokes 52*a*12 is in contact with a second end surface 52*a*15 of adjacent one of the other first yokes 52*a*12.

Each of the first core pieces 52*a*11 is formed from an electromagnetic steel plate stamped into a T-shape. The width of each of the first teeth 52*a*13 in the circumferential direction is the same from the first yoke 52*a*12 to the end portion of the first tooth 52*a*13. The first end surface 52*a*14 and the second end surface 52*a*15 of the first yoke 52*a*12 in the circumferential direction are both formed flat. When a plurality of first core pieces 52*a*11 are combined into an annular shape, the first end surface 52*a*14 and the second end surface 52*a*15 of the adjacent first yokes 52*a*12 are brought into surface contact with each other.

In the following descriptions, a section where the first end surface 52*a*14 and the second end surface 52*a*15 are in contact with each other is referred to as "abutting portion 52*a*16". In the first yoke 52*a*12, two first swaging portions 52*a*17 are provided to be separated from each other in the circumferential direction. However, no swaging portion is provided in the first teeth 52*a*13. The reason for providing a plurality of first swaging portions 52*a*17 only in the first yoke 52*a*12 in the manner as described above will be explained later.

Figure 5:
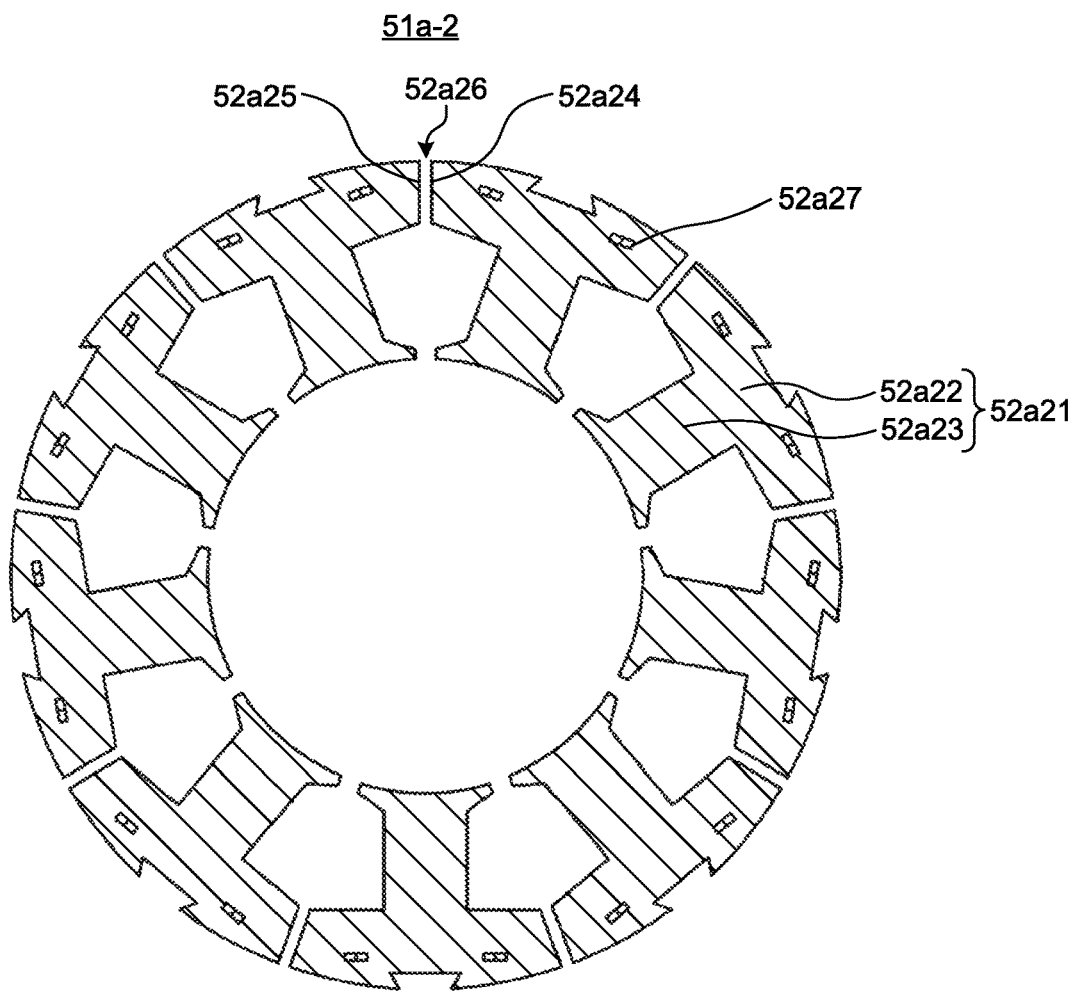
FIG. 5 is a cross-sectional view of a second annular core that constitutes the stator core before being fixed to a frame.

FIG. 5 is a cross-sectional view of the second annular core that constitutes the stator core before being fixed to the frame. A second annular core 51*a*-2 is formed annularly and obtained by disposing a plurality of second core pieces 52*a*21, each including a second yoke 52*a*22, a second tooth 52*a*23 projecting from the second yoke 52*a*22, and second swaging portions 52*a*27, in the circumferential direction of the frame (not illustrated) such that a first end surface 52*a*24 of each of the second yokes 52*a*22 is separated from a second end surface 52*a*25 of adjacent one of the other second yokes 52*a*22.

Each of the second core pieces 52*a*21 is formed from an electromagnetic steel plate stamped into a T-shape. The width of each of the second teeth 52*a*23 in the circumferential direction is the same from the second yoke 52*a*22 to the end portion of the second tooth 52*a*23. The first end surface 52*a*24 and the second end surface 52*a*25 of the second yoke 52*a*22 in the circumferential direction are both formed flat.

The second annular core 51*a*-2 is different from the first annular core 51*a*-1 in that when a plurality of second core pieces 52*a*21 are combined into an annular shape, a gap 52*a*26 is formed between the first end surface 52*a*24 and the second end surface 52*a*25 of the adjacent second yokes 52*a*22. The width of the gaps 52*a*26 in the circumferential direction is 30 µm. In the second yoke 52*a*22, two second swaging portions 52*a*27 are provided to be separated from each other in the circumferential direction. However, no swaging portion is provided in the second teeth 52*a*23. The reason for providing a plurality of second swaging portions 52*a*27 only in the second yoke 52*a*22 in the manner as described above will be explained later.

In the second annular core 51a-2 illustrated in FIG. 5, the gap 52a26 is provided between the adjacent second yokes 52a22. However, the shape of the second annular core 51a-2 is not limited thereto. The second annular core 51a-2 may be configured as described below. That is, when the region where the first yokes 52a12 are in contact with each other in FIG. 4 before the frame is fitted and fixed onto the stator core is defined as a first contact region and the region where the second yokes 52a22 are in contact with each other in FIG. 5 before the frame is fitted and fixed onto the stator core is defined as a second contact region, then the second annular core 51a-2 before the frame is fitted and fixed onto the stator core is configured such that the second contact region is smaller than the first contact region.

As described above, it is possible that the second annular core 51a-2 is configured such that the gap 52a26 is formed between the second yokes 52a22 or the second contact region is smaller than the first contact region before the frame is fitted and fixed onto the stator core.

Figure 6:
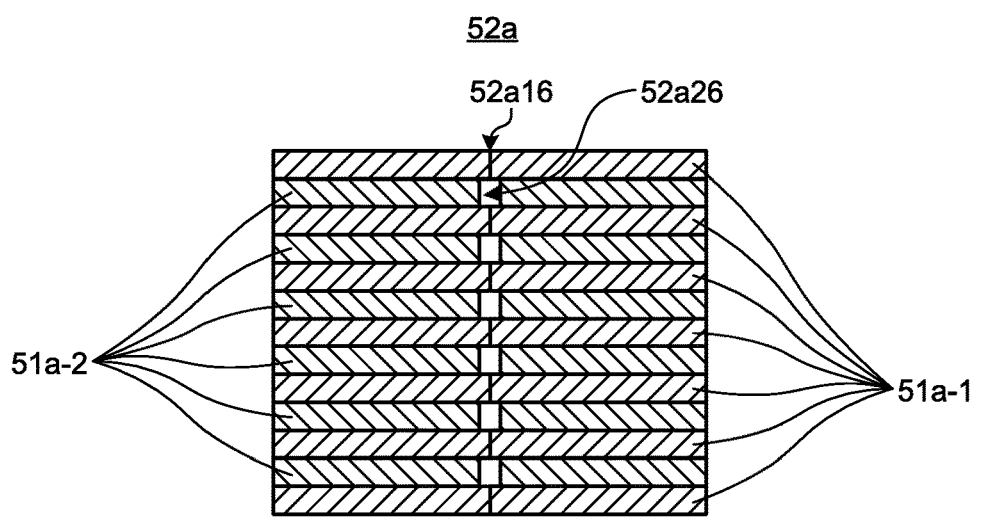
FIG. 6 is a cross-sectional view of the stator core in the stacking direction before a frame is fitted and fixed onto the stator core.

FIG. 6 is a cross-sectional view of the stator core in the stacking direction before the frame is fitted and fixed onto the stator core. The stator core 52a illustrated in FIG. 6 is obtained by alternately stacking the first annular core 51a-1 illustrated in FIG. 4 and the second annular core 51a-2 illustrated in FIG. 5 and by fastening the adjacent annular cores to each other by using the first swaging portions 52a17 and the second swaging portions 52a27. In this manner, the first annular cores 51a-1 and the second annular cores 51a-2 are fixed to each other by the first swaging portions 52a17 and the second swaging portions 52a27.

FIG. 7 is a partially enlarged view of the first annular core and the second annular core that constitute the stator core before the frame is fitted and fixed onto the stator core.

In the first annular core 51a-1 before the frame is fitted and fixed onto the stator core, the first end surface 52a14 and the second end surface 52a15 are in contact with each other. In contrast thereto, in the second annular core 51a-2 before the frame is fitted and fixed onto the stator core, the first end surface 52a24 and the second end surface 52a25 are separated from each other. Thus, in the first annular core 51a-1, the abutting portion 52a16 is provided between the first end surface 52a14 and the second end surface 52a15, and in the second annular core 51a-2, the gap 52a26 is formed between the first end surface 52a24 and the second end surface 52a25.

Figure 8:
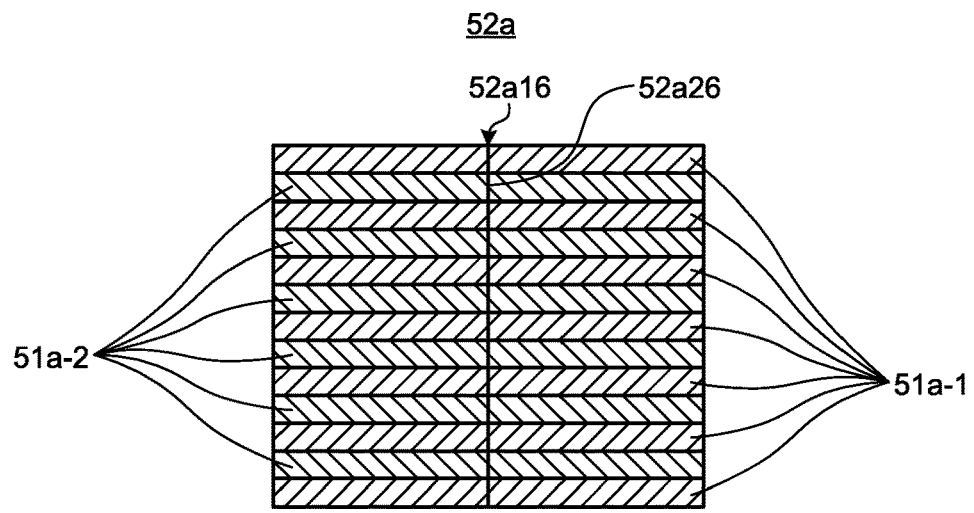
FIG. 8 is a cross-sectional view of the stator core in the stacking direction after a frame is fitted and fixed onto the stator core.

FIG. 8 is a cross-sectional view of the stator core in the stacking direction after the frame is fitted and fixed onto the stator core. The second annular core 51a-2 is compressed by fitting and fixing the frame onto the stator core, and thus the stator core 52a is deformed such that the adjacent second yokes 52a22 are in partial contact with each other. Therefore, in the second annular core 51a-2 illustrated in FIG. 8, the gaps 52a26 illustrated in FIG. 6 are eliminated. Accordingly, the adjacent second yokes 52a22 appear to be in contact with each other.

Specifically, when the region where the second yokes 52a22 are in contact with each other before the frame is fitted and fixed onto the stator core is defined as a second contact region and the region where the second yokes 52a22 are in contact with each other after the frame is fitted and fixed onto the stator core is defined as a third contact region, then the second annular core 51a-2 is configured such that the third contact region is larger than the second contact region.

Figure 9:
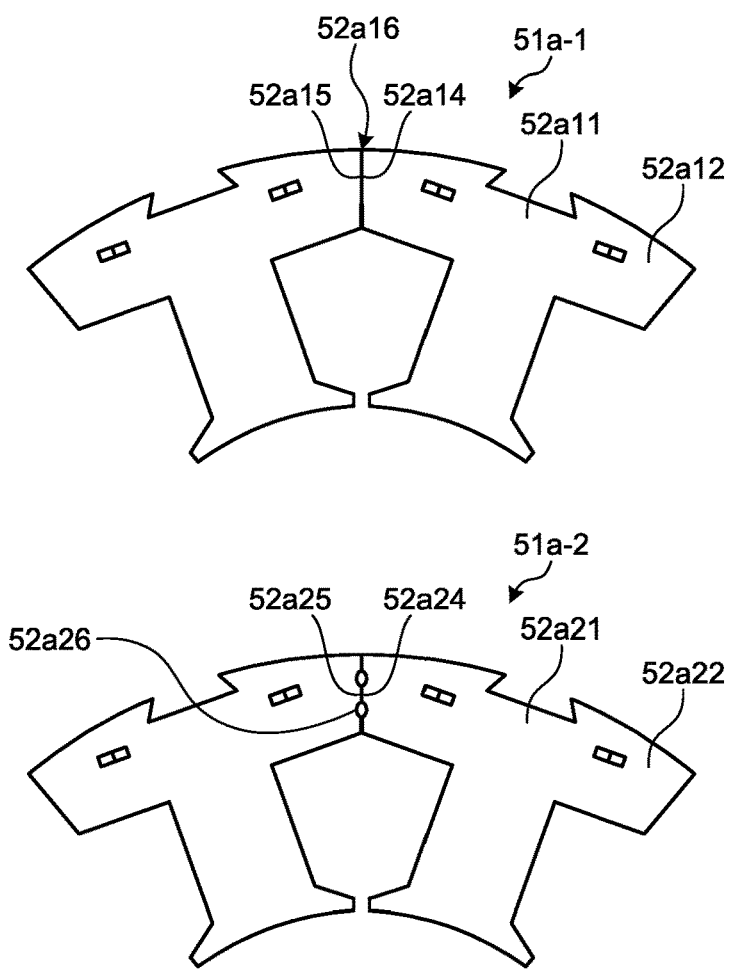
FIG. 9 is a partially enlarged view of the first annular core and the second annular core that constitute the stator core after a frame is fitted and fixed onto the stator core.

FIG. 9 is a partially enlarged view of the first annular core and the second annular core that constitute the stator core after the frame is fitted and fixed onto the stator core. FIG. 9 illustrates a state in which the adjacent second yokes 52a22 are in partial contact with each other. If the adjacent second yokes 52a22 after the frame is fitted and fixed onto the stator core are in a non-contact state, a gap between the adjacent second yokes 52a22 becomes magnetic reluctance and interferes with the flow of a magnetic flux in the second yokes 22. In the stator core 52a according to the first embodiment, at the time of fitting and fixing the frame onto the stator, the gaps 52a26 are adjusted in such a manner that the adjacent second yokes 52a22 are in partial contact with each other.

Therefore, in the stator core 52a after the frame is fitted and fixed onto the stator core, the compressive stress that acts on a section where the second yokes 52a22 are in contact with each other is lower than the compressive stress that acts on a section where the first yokes 52a12 are in contact with each other.

Figure 10:
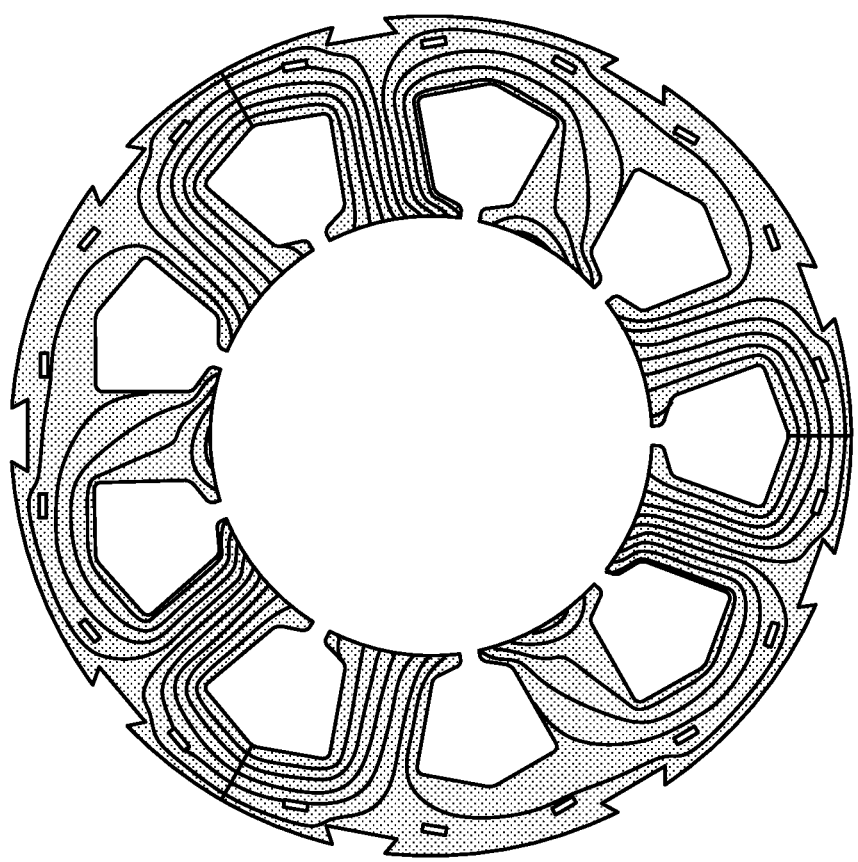
FIG. 10 is a diagram schematically illustrating a magnetic flux that flows through the first annular core and the second annular core after a frame is fitted and fixed onto the stator core.
Figure 11:
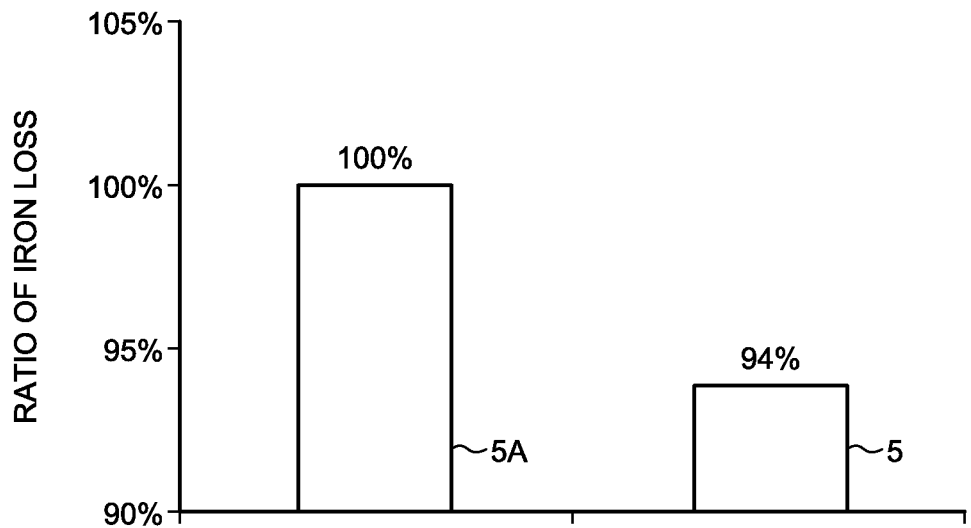
FIG. 11 is a diagram illustrating the ratio of iron loss.

With reference to FIG. 10 and FIG. 11, a description will be specifically given of the compressive stress that acts on a section where yokes are in contact with each other and effects of the present invention.

FIG. 10 is a diagram schematically illustrating a magnetic flux that flows through the first annular cores and the second annular cores after the frame is fitted and fixed onto the stator core. In FIG. 10, illustrations of the frame and the rotor are omitted. In the first annular cores 51a-1 and the second annular cores 51a-2 after the frame is fitted and fixed onto the stator, a magnetic flux flowing from the rotor to the end portions of the teeth is divided at the yokes in the circumferential direction. Therefore, when the teeth and the yokes have an identical magnetic-path width, i.e., when the width through which a magnetic flux flows in the iron core is identical, the magnetic-flux density is higher in the teeth than in the yokes.

Meanwhile, as the frame is fitted and fixed onto the stator core, the compressive stress is generated in the first annular cores and the second annular cores that constitute the stator core due to fitting of the frame. In particular, in a stator core in which a plurality of core pieces are combined into an annular shape as described in the first embodiment, a higher compressive stress is applied to a section where the adjacent core pieces are in contact with each other.

The magnetic-flux density in the stator core can be expressed as the product of magnetic permeability and intensity of a magnetic field. Thus, in a case where the intensity of a magnetic field is set to a constant value, as the compressive stress is increased, the magnetic permeability, i.e., the magnetic-flux density, in a section where yokes are in contact with each other is reduced. Therefore, in a stator core in which a plurality of core pieces are combined into an annular shape, the magnetic properties of the core are degraded due to the compressive stress generated due to fitting of the frame. The motor torque is thus reduced, resulting in an increase in iron loss. Accordingly, the motor characteristics are degraded.

However, by fitting and fixing a frame onto a stator core in which a plurality of core pieces are combined into an annular shape, the adjacent core pieces are brought into contact with each other. This increases the rigidity of the stator core and improves the inner-diameter roundness of the stator core. Accordingly, it is essential for a stator core in which a plurality of core pieces are combined into an annular shape to undergo a manufacturing process of fitting a frame onto the stator core. Thus, there is a trade-off between ease of winding coils in the stator core and improvement in motor characteristics.

In the first embodiment, before the frame is fitted and fixed onto the stator core 52a, the first annular cores 51a-1 are formed such that the adjacent first yokes 52a12 are in contact with each other and the second annular cores 51a-2 are configured such that the gaps 52a26 are formed between the second yokes 52a22 or are configured such that the second contact region is smaller than the first contact region.

With this configuration, when the frame is fitted and fixed onto the stator core 52a, the compressive stress is generated in a section of the first annular core 51a-1 where the adjacent yokes are in contact with each other in a similar manner to a conventional stator core. However, the compressive stress that acts on a section of the second annular core 51a-2 where the adjacent yokes are in contact with each other is lower than the compressive stress that acts on the section of the first annular core 51a-1 where the adjacent yokes are in contact with each other.

Meanwhile, in the section of the second annular core 51a-2 where the adjacent yokes are in contact with each other, a contact force is reduced. Thus, there is a concern about degradation in rigidity and roundness of the second annular core 51a-2. As a solution to this problem, if the first annular core 51a-1 and the second annular core 51a-2 are fastened to each other by swaging, the compressive stress in the peripheral region of the swaging portions is increased and accordingly the motor characteristics are degraded.

Therefore, in the stator core 52a according to the first embodiment, swaging portions are provided only in the yokes. By providing swaging portions only in the yokes, the second annular core 51a-2 is fixed by the first annular core 51a-1 and this ensures sufficient rigidity and roundness of the second annular core 51a-2. Further, by providing swaging portions only in the yokes, the compressive stress is distributed to the swaging portions in the yokes when the frame is fitted and fixed onto the stator core. Thus, a reduction in magnetic permeability, i.e., magnetic-flux density, of the teeth susceptible to the compressive stress can be suppressed. Accordingly, degradation in motor characteristics can be suppressed.

Besides the fixing by swaging, there are various methods to fix the second annular core 51a-2 to the first annular core 51a-1, such as fitting and bonding. However, in order to suppress degradation in motor characteristics while ensuring sufficient rigidity and roundness of the second annular core 51a-2, it is desirable to fix the second annular core 51a-2 to the first annular core 51a-1 by using the second swaging portions 52a27 formed in the second yokes 52a22.

FIG. 11 is a diagram illustrating the ratio of iron loss. In FIG. 11, the ratio of iron loss caused in a conventional permanent magnet embedded motor 5A after the frame is fitted and fixed onto the stator core is defined as 100%. FIG. 11 illustrates the ratio of iron loss caused in the stator core of the motor 5 according to the first embodiment after the frame is fitted and fixed onto the stator core.

As it is clear from FIG. 11, in the permanent magnet embedded motor 5 according to the first embodiment, the iron loss caused in the stator core after the frame is fitted and fixed onto the stator core is reduced by 6% as compared to the conventional permanent magnet embedded motor 5A. This indicates that the iron loss is reduced by reducing the compressive stress that acts on the inner portion of the stator core. In the manner as described above, the motor 5 according to the first embodiment can have improved motor efficiency.

The stator core according to the first embodiment is not limited to a stator core formed by alternately stacking the first annular core 51a-1 and the second annular core 51a-2. It is also possible that the stator core is configured as described below.

Figure 12:
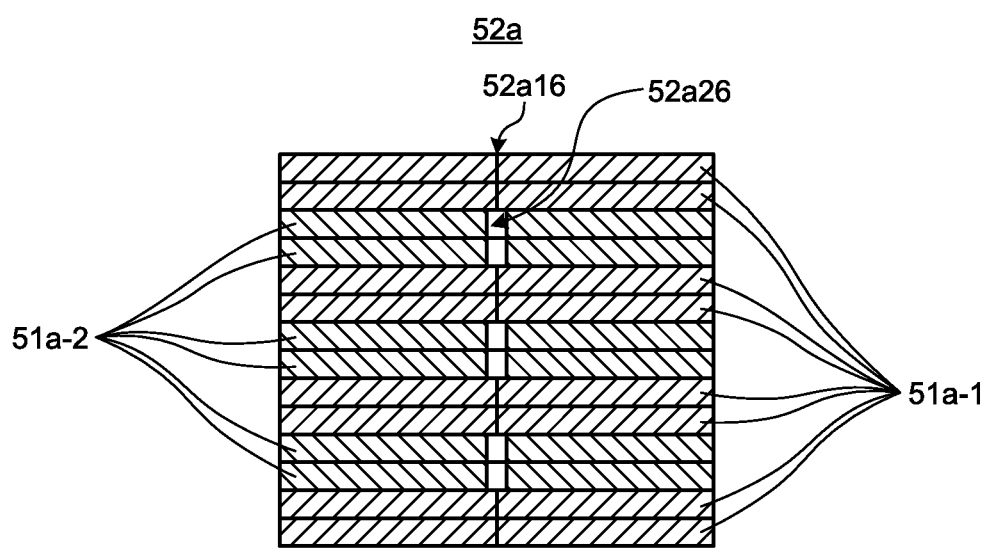
FIG. 12 is a diagram illustrating a modification of the stator core according to the first embodiment.

FIG. 12 is a diagram illustrating a modification of the stator core according to the first embodiment. The stator core 52a illustrated in FIG. 12 is formed by alternately stacking two first annular cores 51a-1 that are paired and two second annular cores 51a-2 that are paired and by fastening the adjacent annular cores to each other by using swaging portions formed in the yokes. Even when the stator core 52a is configured in this manner, the compressive stress in the stator core is still reduced. This makes it possible to improve the motor efficiency.

In the first embodiment, a compressor motor is described as an example. However, the structure of the stator core according to the first embodiment can be also applied to motors other than the compressor motor, such as an induction motor that does not use a permanent magnet. These motors can also obtain the same effects as those obtained by the compressor motor. In a motor other than the compressor motor, a cylindrical frame is used in place of the frame 2 for a compressor. In the first embodiment, a rotor with six magnetic poles is used. However, the rotor can have any number of magnetic poles that is equal to or greater than two. Further, in the first embodiment, the first end surface 52a14 and the second end surface 52a15 in the circumferential direction of each of the first yokes 52a12 are both formed flat. However, the shape of both end portions of each of the first yokes 52a12 is not limited thereto, but may be a curved shape or an irregular shape, for example. Similarly, in the first embodiment, the first end surface 52a24 and the second end surface 52a25 in the circumferential direction of each of the second yokes 52a22 are both formed flat. However, the shape of both end portions of each of the second yokes 52a22 is not limited thereto, but may be a curved shape or an irregular shape, for example.

Second Embodiment

Figure 13:
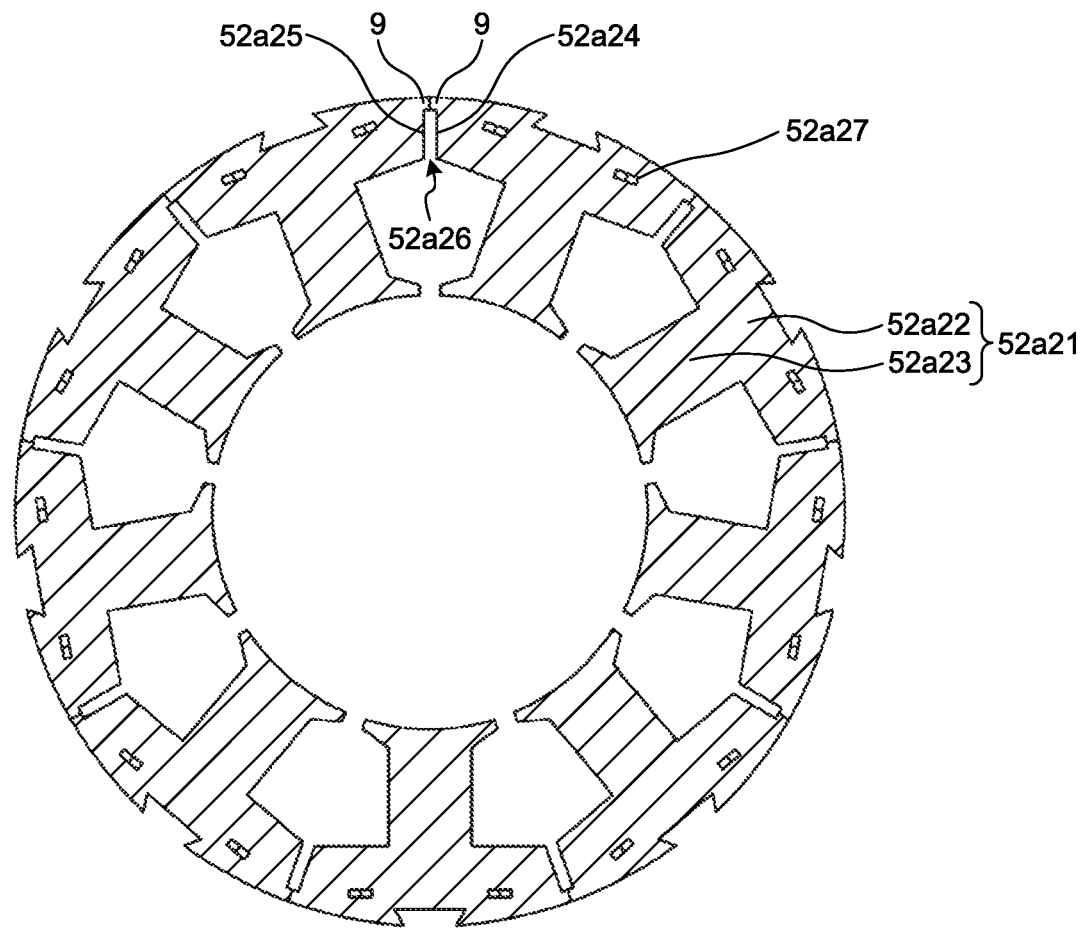
FIG. 13 is a cross-sectional view of a second annular core that constitutes a stator core to be used in a motor according to a second embodiment.

FIG. 13 is a cross-sectional view of a second annular core that constitutes a stator core to be used in a motor according to a second embodiment. FIG. 13 illustrates a second annular core 51a-2A before being fixed to a frame. The second annular core 51a-2A is different from the second annular core 51a-2 according to the first embodiment in that projections 9 are provided on the first end surface 52a24 and the second end surface 52a25 of the second yokes 52a22 in the circumferential direction.

Each of the projections 9 is provided at a position at which the first end surface 52a24 and the second end surface 52a25 face each other. The width of the projections 9 in the circumferential direction is set to such a dimension that the first end surface 52a24 and the second end surface 52a25 are brought into partial contact with each other when the frame is fitted and fixed onto the stator core. In FIG. 13, the gap 52a26 is formed between the first end surface 52a24 and the second end surface 52a25.

It is sufficient that the projections 9 are formed so as to have a smaller width in the radial direction than the width of each end surface in the radial direction. In FIG. 13, the projections 9 are formed on the outer side of the end surfaces in the radial direction. However, the positions of the projections 9 are not limited thereto. It is also possible that the projections 9 are formed at the center or on the inner side of the end surfaces in the radial direction.

A stator core is formed by alternately stacking the first annular core 51a-1 illustrated in FIG. 4 and the second annular core 51a-2A illustrated in FIG. 13 and by fastening the first swaging portions 52a17 illustrated in FIG. 4 and the second swaging portions 52a27 illustrated in FIG. 13 to each other.

The adjacent projections 9 are compressed and deformed by fitting and fixing the frame onto the stator core. At this time, a compressive stress generated in a section where the first end surface 52a24 and the second end surface 52a25 are in contact with each other and where the projections 9 are not present is lower than the compressive stress generated in the projections 9 and is lower than the compressive stress that acts on a section where the first yokes 52a12 are in contact with each other.

The motor configured to include the second annular cores 51a-2A as described above can obtain the same effects as the motor according to the first embodiment. Simultaneously, because the adjacent projections 9 are in contact with each other, the rigidity of the stator core is increased and the inner-diameter roundness of the stator core is further improved.

Third Embodiment

Figure 14:
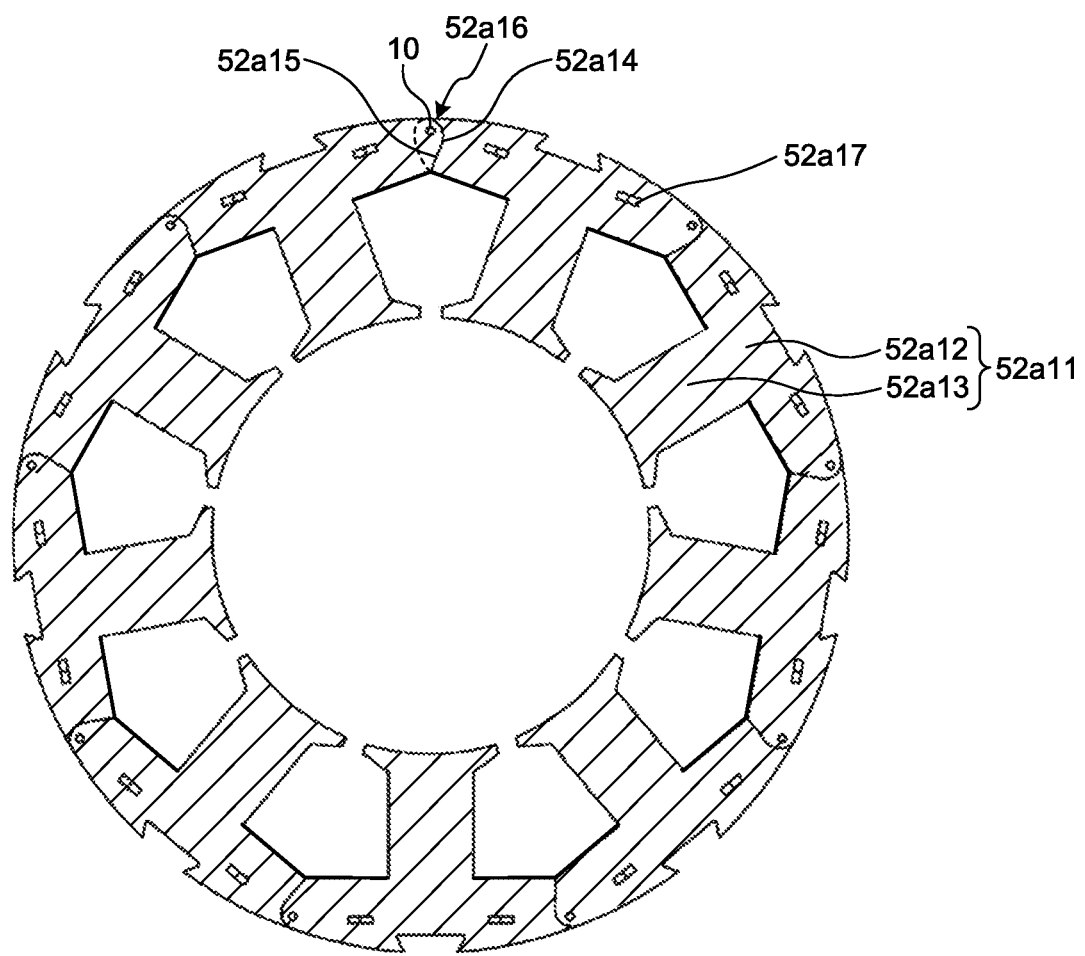
FIG. 14 is a cross-sectional view of a first annular core that constitutes a stator core to be used in a motor according to a third embodiment.

FIG. 14 is a cross-sectional view of a first annular core that constitutes a stator core to be used in a motor according to a third embodiment. FIG. 14 illustrates a first annular core 51a-1B before being fixed to a frame. The first annular core 51a-1B is different from the first annular core 51a-1 according to the first embodiment in that the first end surface 52a14 and the second end surface 52a15 are both formed into a curved shape, and a dowel 10, which is a first projection that projects in the axial direction, is formed near the first end surface 52a14 and near the second end surface 52a15 in the circumferential direction.

The dowel 10 is a projection to be used for connecting the adjacent first yokes 52a12 with each other. The dowel 10 has a structure in which by pressing one end surface of the first yoke 52a12 in the axial direction, the dowel 10 projects to the other end surface side of the first yoke 52a12 in the axial direction. For example, a projection portion of the dowel 10 formed on the first yoke 52a12 that is one of the two adjacent first yokes 52a12 is inserted into a recess portion of the dowel 10 formed on the other first yoke 52a12, thereby connecting the adjacent first yokes 52a12 with each other.

Figure 15:
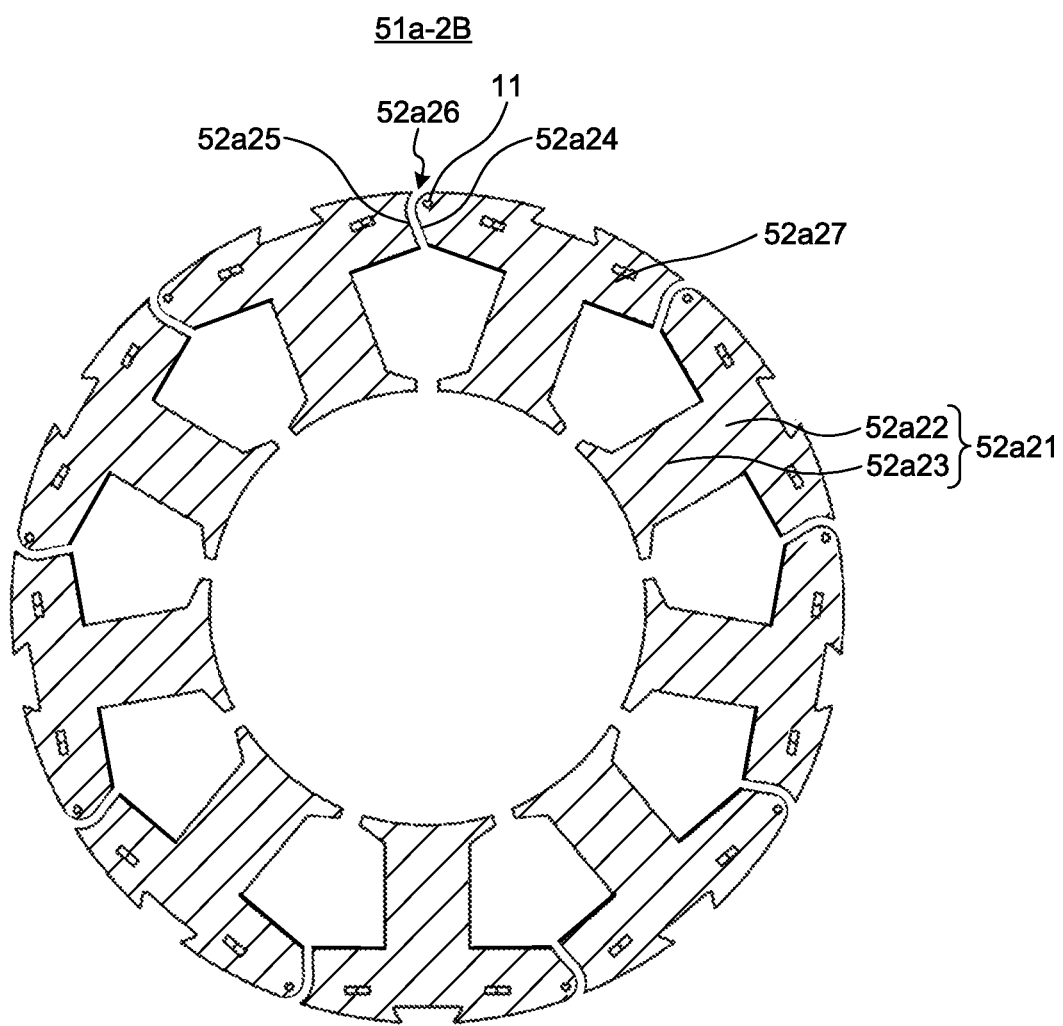
FIG. 15 is a cross-sectional view of a second annular core that constitutes the stator core to be used in the motor according to the third embodiment.

FIG. 15 is a cross-sectional view of a second annular core that constitutes the stator core to be used in the motor according to the third embodiment. FIG. 15 illustrates a second annular core 51a-2B before being fixed to a frame. The second annular core 51a-2B is different from the second annular core 51a-2 according to the first embodiment in that the first end surface 52a24 is formed into a curved convex shape, the second end surface 52a25 is formed into a curved concave shape, and a dowel 11, which is a second projection that projects in the axial direction, is formed near the first end surface 52a24.

The dowel 11 has a structure in which by pressing one end surface of the second yoke 52a22 in the axial direction, the dowel 11 projects to the other end surface of the second yoke 52a22 in the axial direction. The dowel 11 is formed near the first end surface 52a24 so as to be inserted into the recess portion of the dowel 10 described above.

A stator core is formed by alternately stacking the first annular core 51a-1B illustrated in FIG. 14 and the second annular core 51a-2B illustrated in FIG. 15, inserting the dowels 11 into the dowels 10, and fastening the first swaging portions 52a17 and the second swaging portions 52a27 to each other.

The motor according to the third embodiment can obtain the same effects as the motor according to the first embodiment. Simultaneously, the dowels 10 on the first annular cores 51a-1B serve as connecting portions and thus a group of core pieces configured from a plurality of first core pieces 52a11 can be developed with reduced constraints. This facilitates assembly of the stator core.

As described above, the motor 5 according to the first to third embodiments includes: a cylindrical frame; a cylindrical stator core, which is disposed on an inner side of the cylindrical frame and configured by stacking a first annular core and a second annular core in an axial direction of the cylindrical frame; and a rotor disposed on an inner side of the cylindrical stator core. The first annular core is formed annularly by disposing a plurality of first core pieces, respectively including first yokes, first teeth projecting from the first yokes, and first swaging portions, such that each of the first core pieces is in contact with the adjacent one of the other first core pieces, the second annular core is disposed adjacent to the first annular core and formed annularly by disposing a plurality of second core pieces, respectively including second yokes, second teeth projecting from the second yokes, and second swaging portions, such that each of the second core pieces is separated from adjacent one of the other second core pieces, and the first annular core and the second annular core are fixed to each other by using the first swaging portions and the second swaging portions.

With this configuration, while degradation in magnetic properties of the stator core fitted and fixed to the frame is suppressed, the rigidity and inner-diameter roundness of the stator core can be improved. Therefore, variations in the positions of the tooth ends are suppressed. Cogging is suppressed and accordingly the motor characteristics are improved. In the conventional technique, there is a gap in a magnetic path in a yoke portion. However, there is not such a gap in the motor 5 according to the first to third embodiments. Thus, an increase in magnetic reluctance is suppressed and accordingly the motor efficiency can be improved.

Fourth Embodiment

Figure 16:
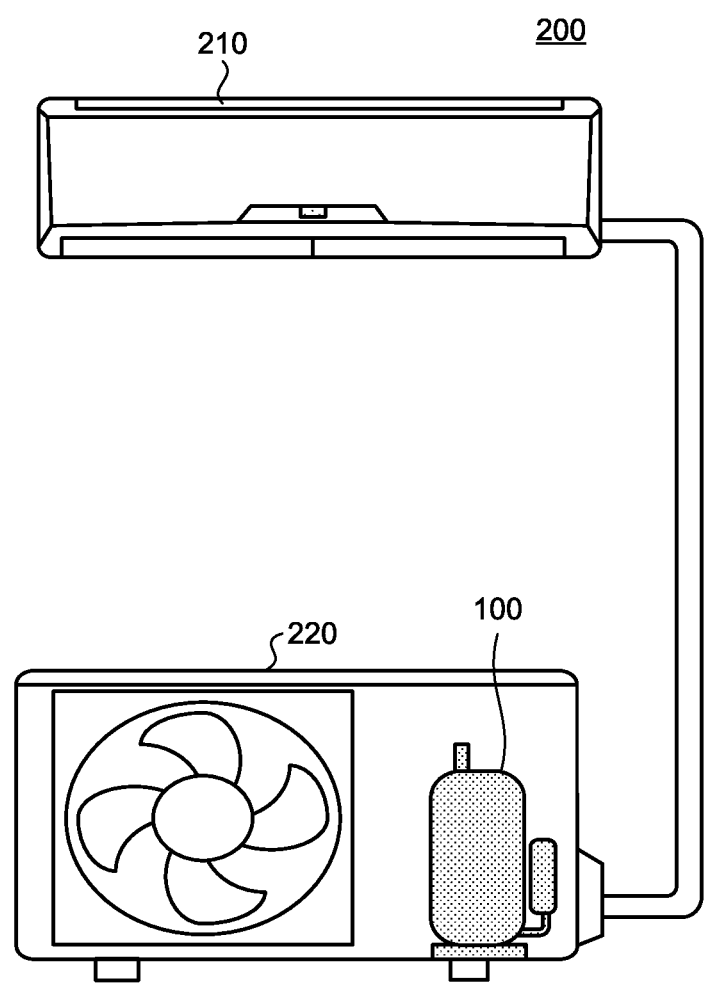
FIG. 16 is a configuration diagram of a refrigerating and air conditioning apparatus according to a fourth embodiment.

FIG. 16 is a configuration diagram of a refrigerating and air conditioning apparatus according to a fourth embodiment. An air conditioner 200 as an example of the refrigerating and air conditioning apparatus includes an indoor unit 210 and an outdoor unit 220 connected to the indoor unit 210. In the air conditioner 200, the compressor 100 in which the motor 5 described in any of the first to third embodiments is incorporated is used as a constituent element of a refrigeration circuit configured from the indoor unit 210 and the outdoor unit 220. With this configuration, the refrigerating and air conditioning apparatus that is highly efficient and can reduce the vibration level can be obtained.

The configurations described in the above embodiments are only examples of the content of the present invention. The configurations can be combined with other well-known techniques, and part of each of the configurations can be omitted or modified without departing from the scope of the present invention.

The invention claimed is:
1. A permanent magnet embedded motor comprising:
a cylindrical frame;
a cylindrical stator core, which is disposed on an inner side of the cylindrical frame and configured by stacking a first annular core and a press-fit second annular core in an axial direction of the cylindrical frame, wherein the press-fit second annular core is press fit into the cylindrical frame; and a rotor disposed on an inner side of the cylindrical stator core, wherein the first annular core is formed annularly by disposing a plurality of first core pieces, respectively including first yokes, first teeth projecting from the first yokes, and first swaging portions, such that each of the first core pieces is in contact with an adjacent one of the other first core pieces, the press-fit second annular core is disposed adjacent to the first annular core and formed annularly by disposing a plurality of second core pieces, respectively including second yokes, second teeth projecting from the second yokes, and second swaging portions, such that a projection of each of the second core pieces is in contact with a projection of an adjacent one of the other second core pieces before being press fit into the cylindrical frame, projections are located on first end surfaces in a circumferential direction of the second yokes, projections are located on second end surfaces of the second yokes in the circumferential direction, each of the projections on the first end surfaces and the second end surfaces has substantially a same shape, a top of a projection of one of the second yokes and a top of a projection of another one of second yokes that is adjacent to the one of the second yokes face each other in the circumferential direction, the first annular core and the press-fit second annular core are fixed to each other by using the first swaging portions and the second swaging portions, and a region where the second yokes are in contact with each other after the stator core is fixed to the inner circumferential surface of the cylindrical frame is larger than a region where the second yokes are in contact with each other before the stator core is press fit into the inner circumferential surface of the cylindrical frame.

2. The permanent magnet embedded motor according to claim 1, wherein the first swaging portion is formed only in the first yokes, and the second swaging portion is formed only in the second yokes.

3. A compressor having the permanent magnet embedded motor according to claim 1 and a compression mechanism incorporated therein.

4. A refrigerating and air conditioning apparatus comprising the compressor according to claim 3 as a constituent element of a refrigeration circuit.

5. The permanent magnet embedded motor according to claim 1, wherein the first end surfaces and the second end surfaces have substantially a same shape.

* * * * *